Figure 1:
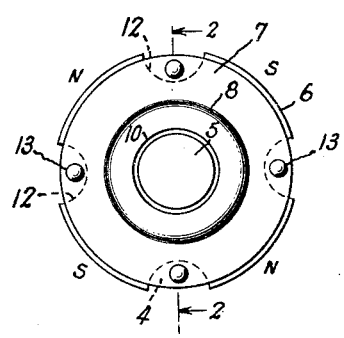

Aug. 5, 1952     C. A. THOMAS     2,606,219

AUTOMATIC KEEPER FOR PERMANENT MAGNETS

Filed May 10, 1951

Inventor:
Charles A. Thomas, Deceased,
by Jeanne M. Thomas, Administratrix,
by Ernest C. Britton
Her Attorney.

Patented Aug. 5, 1952

2,606,219

UNITED STATES PATENT OFFICE 2,606,219

AUTOMATIC KEEPER FOR PERMANENT MAGNETS

Charles A. Thomas, deceased, late of Fort Wayne, Ind., by Jeanne M. Thomas, administratrix, Fort Wayne, Ind., assignor to General Electric Company, a corporation of New York Application May 10, 1951, Serial No. 225,488

2 Claims. (Cl. 171—209)

The invention relates to dynamoelectric machines utilizing permanent magnets as a source of magnetic flux and more particularly to keepers for such magnets which make possible the utilization and conservation of a greater portion of the maximum magnetic energy available in the permanent magnets.

In one method employed for charging permanent magnets, the magnetic circuit during the charging operation consists of the magnetic retentive material to be charged and an electromagnet bridging the intended poles of the magnetic retentive material. When an electric current traverses the electromagnet, magnetic flux is set up in the magnetic material. If the current in the electromagnet is then discontinued, a large portion of the magnetic flux will persist so long as the magnetic circuit remains intact; but if the magnetic circuit is interrupted, even momentarily, the residual flux in the magnetic material falls to a much lower value and it cannot be restored by merely reclosing the interrupted magnetic circuit.

The invention provides a keeper which will provide an auxiliary flux path between the poles of the permanent magnet during the charging operation and also when the electromagnet used to charge the permanent magnet is removed. The keeper is also automatically rendered substantially ineffective when the permanent magnet structure is assembled in a dynamoelectric machine and again becomes effective to establish an auxiliary magnetic circuit when the machine is disassembled. It is therefore apparent that the keeper will provide complete protection to maintain the available magnetic energy of a permanent magnet at a very high level during the period of its entire life. Because of this, a very small quantity of material having magnetic retentive properties may be used in such magnets, and a dynamoelectric machine having a permanent magnet rotor of low inertia can be built. Likewise, if such a permanent magnet is used as a source of flux excitation in a dynamoelectric machine, as for example a tachometer generator, it will not need to be recalibrated each time it is removed from the machine because of the protection provided by the automatic keeper.

It is an object of the invention to provide a keeper element which will automatically operate to conserve the available magnet energy of a permanent magnet.

It is another object of the invention to provide a dynamoelectric machine having permanent magnet as a source of excitation flux and being provided with a keeper element which is automatically operable to conserve this excitation flux.

Further objects and advantages of the invention will become apparent and the invention will be better understood from the following description referring to the accompanying drawing, and the features of novelty which characterize the invention will be pointed out with particularity in the claims annexed to and forming part of this specification.

In accordance with the invention, a low inertia permanent magnet rotor is provided for a dynamoelectric machine. A flux keeper adapted to provide a flux path when the rotor is not assembled in the machine is permanently secured to the rotor. A thrust member, secured to the keeper, contacts the end of the sleeve bearing to automatically disengage the keeper when the rotor is assembled in the machine. The keeper is likewise automatically operable to provide a flux path for the rotor magnets before the magnetic path through the stator of the machine is interrupted during the disassembly of the machine. A spring may be provided between the keeper and the permanent magnet rotor to lessen the end thrust on the rotor.

Figure 2:
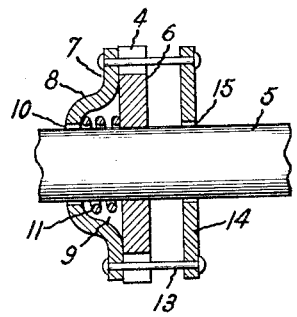
Figure 3:
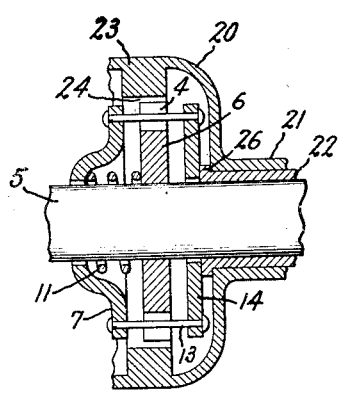
Figure 4:
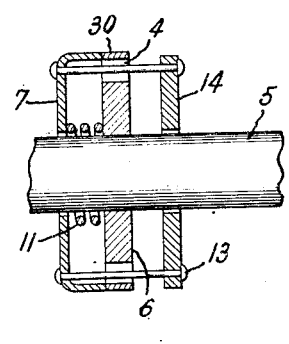

In the drawing, Fig. 1 is the end view of a rotor assembly embodying the invention. Fig. 2 is a fragmentary sectional view taken along line 2—2 of Fig. 1. Fig. 3 is a fragmentary sectional view showing a dynamoelectric machine in which the rotor assembly of Fig. 1 is installed. Fig. 4 is a fragmentary sectional view illustrating a modification of the invention.

Referring to the drawing, there is shown a shaft 5 upon which a permanent magnet rotor 6 is rigidly fixed. A keeper element 7, formed of a magnetic material, is adapted to provide a flux path connecting the poles of the permanent magnet. Keeper 7 is offset in cross-section as at 8 to define a chamber 9 in which a spring 11 may be placed. The function of spring 11 will be described hereinafter. Keeper 7 is provided with a central aperture 10 to provide a sliding fit with respect to shaft 5. Permanent magnet rotor 6 is polarized radially to form polar areas at its outer surface as shown in Fig. 1. Since keeper 7 engages the side of the rotor, some axial magnetization of rotor 6 is required for the keeper to be fully effective.

A plurality of depressions 4 are formed on the outer periphery of rotor 6. These depressions are defined by broken lines 12 and serve to separate adjacent polar areas of the rotor. Ends of a plurality of bolts, or rivets, 13 are rigidly secured to the keeper element 7 and pass through the depression 4 in permanent magnet 6. The opposite end of these bolts are fixed to a cylindrical thrust member 14. Preferably bolts 13 are made of a non-magnetic material. Thrust member 14 is provided with a central aperture 15 which engages shaft 5 for a sliding connection.

Referring now particularly to Fig. 3, there is shown a sectional view of a dynamoelectric machine having the rotor assembly illustrated in Fig. 2 installed. The stator member 20 is provided with a bearing housing 21 in which bearing 22 is positioned. While bearing 22 is shown as a sleeve bearing, it is obvious that any type of bearing could be used. Stator member 20 is provided with pole structure 23 separated from rotor 6 by an air gap 24. When rotor 6 is installed in stator 20, a magnetic path will be provided for the flux of rotor 6 through poles 23 in the usual manner. When the machine is assembled, it is necessary to keep keeper 7 inoperative so that substantially all the flux will pass through the stator. To accomplish this, thrust member 14 is adapted to engage the end 26 of bearing 22 during the assembly of the rotor in the stator. The keeper is maintained in this inoperative position by the thrust between thrust member 14 and bearing 22. In order that the force between member 14 and bearing 22 may not result in an objectionable end thrust on the rotor, a spring 11 may be provided. Spring 11 operates in compression and tends to overcome the attractive force between keeper 7 and permanent magnet rotor 6. If end thrust is not of any consequence, spring 11 may be omitted. When a spring is used, it is of such strength that it will not completely overcome the magnetic attraction between thrust member 14 and stationary bearing 22. Thus, as the rotor is being disassembled from the machine, the magnetic attraction between permanent magnet rotor 6 and keeper 7, being greater than the compressive force of the spring, will automatically draw keeper 7 into contact with rotor 6. It will be observed that the face of stator poles 23 adjacent air gap 24 are axially longer than the corresponding faces of rotor poles 6. This is necessary to insure that keeper 7 will provide a path of low reluctance for the magnetic flux of rotor 6 before the path through the stator of the machine is interrupted.

Referring now to the modification shown in Fig. 4, pole pieces of a magnetic material such as soft iron are secured to the periphery of the poles of permanent magnet 6. These pole pieces may be formed as a thin ring 30 which surrounds the entire rotor 6, or may be a plurality of short segments secured to the pole pieces of permanent magnet 6 in any manner. By using these non-permanent magnet pole pieces, no side magnetization of the permanent magnet 6 is required. If a ring surrounding the entire rotor is used, the cross-sectional area must be small so that it does not carry a large portion of the flux, by-passing the stator. The method of operation of the keeper in Fig. 4 is the same as has hereinbefore been explained.

From the foregoing, it is apparent that there is provided an automatically operating keeper for conserving the magnetic energy of a permanent magnet. It is likewise apparent that by the practice of this invention, the permanent magnet source of flux excitation in a dynamoelectric machine may be made of a smaller size than heretofore and yet maintain the same output characteristics. Also, by the practice of the invention it is possible to remove the permanent magnet rotor from a dynamoelectric machine for servicing or repairing the machine without the necessity for remagnetizing the magnet or recalibrating the machine.

While there have been illustrated and described particular embodiments of the invention, modifications thereof will occur to those skilled in the art. It should be understood, therefore, that the invention is not to be limited to the particular arrangements disclosed and the appended claims are intended to cover all modifications thereof which do not depart from the spirit and scope of the invention.

What is claimed is:

1. In a dynamoelectric machine of the class described having a stator assembly including a bearing, a rotor assembly including a permanent magnet mounted on the shaft of said machine, a keeper element arranged on one side of said magnet for conserving the magnetic properties thereof when said rotor assembly is not positioned in said stator assembly, a thrust member arranged on the other side of said magnet, said magnet having a plurality of openings formed therethrough, means for connecting said keeper and said thrust member and arranged in said openings, and a spring arranged between said magnet and said keeper for bracing said keeper away from said magnet, said thrust member being engaged by said bearing when said rotor assembly is positioned in said stator assembly to move said keeper away from said permanent magnet.

2. A dynamoelectric machine characterized by a permanent magnet rotor and a keeper element for maintaining magnetic properties of said rotor, means automatically effective upon assembly of the machine for displacing said element to a position in which said element is substantially ineffective, said means including spring means of such strength that the flux threading the keeper is greater than the spring force whereby said keeper is attracted to said rotor upon the disassembly of said machine.

JEANNE M. THOMAS,
*Administratrix of the Estate of Charles A. Thomas, deceased.*

REFERENCES CITED

The following references are of record in the file of this patent:

UNITED STATES PATENTS

| Number | Name | Date |
| --- | --- | --- |
| 1,153,127 | Lynch | Sept. 7, 1915 |
| 1,484,619 | Blake | Feb. 26, 1924 |
| 2,540,845 | Thomas | Feb. 6, 1951 |